(12) United States Patent
Green et al.

(10) Patent No.: US 10,803,130 B2
(45) Date of Patent: Oct. 13, 2020

(54) SYSTEMS AND METHODS FOR FILTERING PAGE RECOMMENDATIONS

(71) Applicant: Facebook, Inc., Menlo Park, CA (US)

(72) Inventors: Bradley Ray Green, Snohomish, WA (US); Betty Yee Man Cheng, Kirkland, WA (US); Jinyi Yao, Issaquah, WA (US)

(73) Assignee: Facebook, Inc., Menlo Park, CA (US)

(*) Notice: Subject to any disclaimer, the term of this patent is extended or adjusted under 35 U.S.C. 154(b) by 685 days.

(21) Appl. No.: 14/980,286

(22) Filed: Dec. 28, 2015

(65) Prior Publication Data

US 2017/0185682 A1    Jun. 29, 2017

(51) Int. Cl.
- *G06F 7/02* (2006.01)
- *G06F 16/00* (2019.01)
- *G06F 16/9535* (2019.01)
- *G06F 16/951* (2019.01)
- *G06F 16/2457* (2019.01)
- *G06F 16/435* (2019.01)

(52) U.S. Cl.
CPC .... *G06F 16/9535* (2019.01); *G06F 16/24578* (2019.01); *G06F 16/435* (2019.01); *G06F 16/951* (2019.01)

(58) Field of Classification Search
CPC ........... G06F 17/30867; G06F 17/3053; G06F 17/30864; G06F 17/30029; G06F 17/30528; G06F 16/9535; G06F 16/24578; G06F 16/951; G06F 16/435; G06F 16/24575; G06Q 30/02
See application file for complete search history.

(56) References Cited

U.S. PATENT DOCUMENTS

| | | | |
|---|---|---|---|
| 9,648,130 B1* | 5/2017 | Tam | H04L 67/306 |
| 2011/0295612 A1* | 12/2011 | Donneau-Golencer | G06Q 30/02 705/1.1 |
| 2012/0158513 A1* | 6/2012 | Schoen | G06Q 30/0269 705/14.66 |
| 2013/0060843 A1* | 3/2013 | Yamahara | G06Q 30/06 709/203 |
| 2013/0151539 A1* | 6/2013 | Shi | G06F 17/30867 707/754 |
| 2013/0191416 A1* | 7/2013 | Lee | G06F 17/30979 707/771 |

(Continued)

OTHER PUBLICATIONS

"Logistic Regression (Logit Model)—A Brief Overview," Stephanie at www.statisticshowto.datasciencecentral.com, Oct. 29, 2014, retrieved from https://www.statisticshowto.datasciencecentral.com/logistic-regression/ on Oct. 9, 2019 (Year: 2014).*

*Primary Examiner* — Bruce M Moser
(74) *Attorney, Agent, or Firm* — Sheppard Mullin Richter & Hampton LLP

(57) ABSTRACT

Systems, methods, and non-transitory computer-readable media can determine a profile model for a page that is accessible through the social networking system, the profile model describing one or more modal characteristics of users of the social networking system that have fanned the page. A determination can be made that the page should be recommended to a first user of the social networking system based at least in part on the profile model. At least one page recommendation that references the page can be provided to the first user.

20 Claims, 7 Drawing Sheets

(56) References Cited

U.S. PATENT DOCUMENTS

2014/0298204 A1* 10/2014 Jayaram ............... H04L 67/306
  715/753
2016/0012135 A1* 1/2016 Wang ................ G11C 14/0018
  707/731
2017/0046390 A1* 2/2017 Jain ...................... G06F 16/248

* cited by examiner

SYSTEMS AND METHODS FOR FILTERING PAGE RECOMMENDATIONS

FIELD OF THE INVENTION

The present technology relates to the field of content provision. More particularly, the present technology relates to techniques for filtering page recommendations.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content.

SUMMARY

Various embodiments of the present disclosure can include systems, methods, and non-transitory computer readable media configured to determine a profile model for a page that is accessible through the social networking system, the profile model describing one or more modal characteristics of users of the social networking system that have fanned the page. A determination can be made that the page should be recommended to a first user of the social networking system based at least in part on the profile model. At least one page recommendation that references the page can be provided to the first user.

In an embodiment, the systems, methods, and non-transitory computer readable media are configured to determine at least one probability distribution for a profile setting, the probability distribution being constructed using values provided for the profile setting by the users that have fanned the page and determine the one or more modal characteristics corresponding to the page based at least in part on the probability distribution.

In an embodiment, the systems, methods, and non-transitory computer readable media are configured to cluster the values into one or more bins based at least in part on a semantic similarity or a string similarity.

In an embodiment, the systems, methods, and non-transitory computer readable media are configured to provide page recommendations that reference the page to a plurality of users of the social networking system that specified a profile setting value that corresponds to a first modal characteristic in the one or more modal characteristics, determine that a threshold percentage of the page recommendations resulted in at least one conversion by the users, and associate the first modal characteristic with the page.

In an embodiment, the profile setting corresponds to one of the following characteristics: age, gender, gender preference, relationship status, occupation, workplace, education level, an institution of which the user is an alumni, religious affiliation, political affiliation, marital status, parental status, or causes supported by the user.

In an embodiment, at least some of the values provided for the profile setting by the users that have fanned the page are weighted, wherein the weighting of a value specified by a user is based at least in part on a respective affinity between the user and the page.

In an embodiment, the systems, methods, and non-transitory computer readable media are configured to determine that the first user of the social networking system has specified at least one profile setting value that corresponds to at least one of the modal characteristics.

In an embodiment, the systems, methods, and non-transitory computer readable media are configured to determine that the page should not be recommended to a second user of the social networking system based at least in part on the profile model and filter the page from being recommended to the second user.

In an embodiment, the systems, methods, and non-transitory computer readable media are configured to determine that no profile setting values specified by the second user correspond to the one or more modal characteristics.

In an embodiment, the systems, methods, and non-transitory computer readable media are configured to generate a trained machine learning model for the page, the machine learning model being trained to predict whether profile setting values specified by a user correspond to the one or more modal characteristics of users that have fanned the page.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
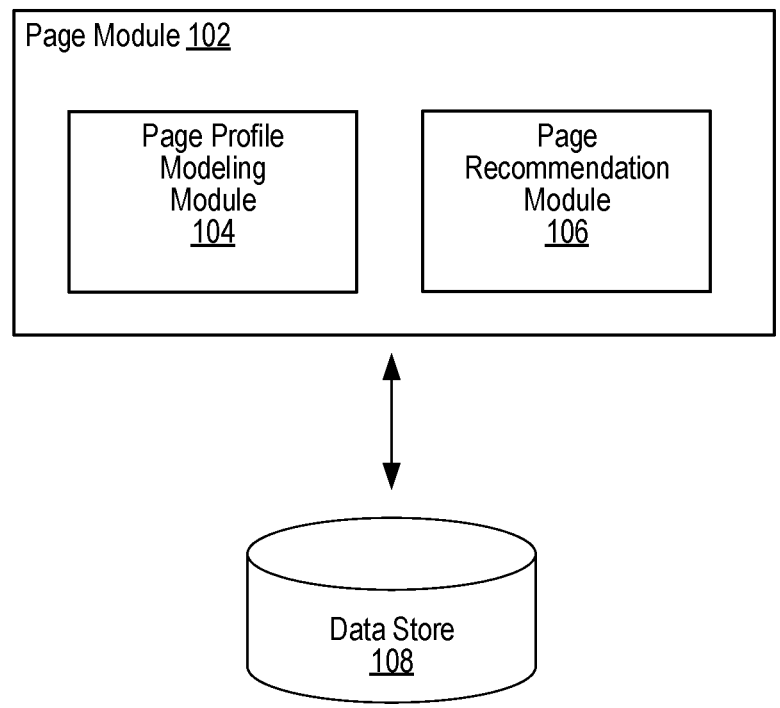
FIG. 1 illustrates an example system including an example page module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Filtering Page Recommendations

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that would also be of interest to the user. Providing such additional content items can enhance the user experience and may help realize the full potential of the social network. Unfortunately, attempts to provide such additional content items and to maintain a high level of interest from the user often fail. The growing size of social networks can also pose problems with respect to the goal of providing content items of high interest to the user. As available content grows in amount, in theory, the likelihood of finding more content items of high interest to the user should increase. However, in practice, the ability to identify content items of high interest to the user can be complicated by the sheer volume of content. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, profiles created by users of a social networking system can be used to determine various characteristics (e.g., profile setting values) that are generally shared among users that are associated with a page. In some embodiments, characteristics that are modal (e.g., characteristics shared among a threshold portion of the users) can be used to recommend pages to other users that share the same characteristics. For example, a threshold portion of users associated with a page for "Amateur Radio Enthusiasts" may have specified "engineer" as their occupation in their respective profiles. Based on this observation, the page "Amateur Radio Enthusiasts" can be recommended to users that are not associated with the page but that have also specified "engineer" as their occupation. In another example, recommendation of the page "Amateur Radio Enthusiasts" may be filtered, or not recommended, for users that have specified their occupation as being something other than "engineer".

In general, pages can be accessed through a social networking system. A page may correspond to an entity (e.g., a business, topic, location, user, etc.). Users of the social networking system can navigate to the page to learn more about the entity as well as access and/or post content through the page. Such content may include text and/or media content items, such as images, videos, and audio. Users of the social networking system have the option to be associated with the page, for example, by "liking" the page (e.g., selecting a "like" option through the social networking system) or by becoming a "fan" the page (e.g., selecting a "fanning" option through the social networking system). A user that is associated with a page can be referred to as a "fan" or someone who has "fanned" the page. In some instances, the social networking system can include content items that are posted to the page in the respective news feeds of users that are associated with the page.

Users of the social networking system can each have a corresponding user profile. Through their respective profiles, users can share various information about themselves, such as their characteristics. For example, a user can specify values for profile settings that correspond to characteristics such as age, gender, gender preference, relationship status, occupation and/or workplace, education level, one or more institutions of which the user is an alumni, religious affiliation, and political affiliation. These profile settings are provided merely as examples and, naturally, users may be able to set additional profile settings to describe other characteristics, such as, for example, marital status, whether the user is a parent, whether the user supports a particular cause, to name some examples. A value for a profile setting can be specified, for example, by providing input in a freeform field or by selecting an option from a set of options associated with the profile setting. Profile settings specified by the user can be published in the user's profile through the social networking system. Depending on the user's privacy settings, some, or all, of the profile settings may be made available publically (e.g., accessible by all users of the social networking system) or privately (e.g., accessible by a limited set of users of the social networking system).

FIG. 1 illustrates an example system 100 including an example page module 102, according to an embodiment of the present disclosure. As shown in the example of FIG. 1, the page module 102 can include a page profile modeling module 104 and a page recommendation module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the page module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the page module 102 can be implemented, in part or in whole, as software running on one or more computing devices or systems, such as on a user or client computing device. In one example, the page module 102 or at least a portion thereof can be implemented as or within an application (e.g., app), a program, or an applet, etc., running on a user computing device or a client computing system, such as the user device 610 of FIG. 6. In another example, the page module 102 or at least a portion thereof can be implemented using one or more computing devices or systems that include one or more servers, such as network servers or cloud servers. In some instances, the page module 102 can, in part or in whole, be implemented within or configured to operate in conjunction with a social networking system (or service), such as the social networking system 630 of FIG. 6.

The page module 102 can be configured to communicate and/or operate with the at least one data store 108, as shown in the example system 100. The at least one data store 108 can be configured to store and maintain various types of data including audience data that identifies users of the social networking system that have fanned pages that are available for access through the social networking system. The audience data can also describe corresponding values for profile settings specified by users of the social networking system. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data.

In various embodiments, the page profile modeling module 104 can be configured to generate respective profile models for pages accessible through the social networking system. More details regarding the page profile modeling module 104 will be provided below with reference to FIG. 2. The page recommendation module 106 can be configured to utilize profile models that correspond to pages for purposes of recommending, or not recommending, pages to users of the social networking system. More details regarding the page recommendation module 106 will be provided below with reference to FIG. 3.

Figure 2:
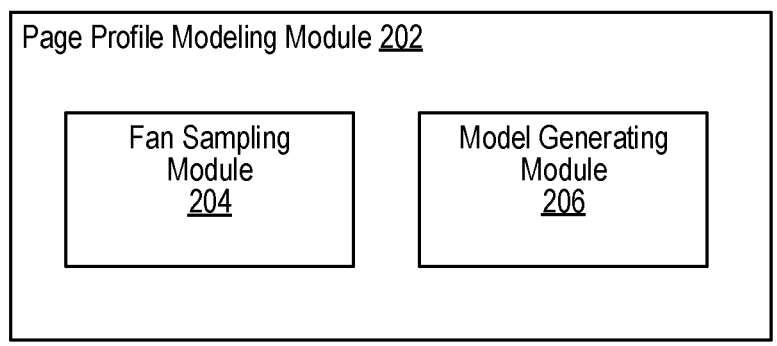
FIG. 2 illustrates an example of a page profile modeling module configured to determine respective profile models for pages, according to an embodiment of the present disclosure.

FIG. 2 illustrates an example of a page profile modeling module 202 configured to determine respective profile models for pages, according to an embodiment of the present disclosure. In some embodiments, the page profile modeling module 104 of FIG. 1 can be implemented as the page profile modeling module 202. As shown in FIG. 2, the page profile modeling module 202 can include a fan sampling module 204 and a model generating module 206.

As mentioned, in various embodiments, profiles created by users of a social networking system can be used to determine various characteristics (e.g., profile setting values) that are generally, or predominantly, shared among users that are associated with a page. For example, in some embodiments, characteristics that are modal (e.g., characteristics shared among a threshold portion of the users) can be used to recommend pages to other users that share the modal characteristics or to filter page recommendations for other users that do not share the modal characteristics.

When determining a profile model for a page, in some embodiments, the fan sampling module 204 can be configured to determine a set of users associated with the page whose profile setting values will be analyzed for purposes of constructing the profile model. In some embodiments, the profiles of all fans of the page are used to determine the profile model. Alternatively, in some embodiments, the profiles of a portion, or subset, of the fans of the page are used to determine the profile model. By selecting a portion of users, the fan sampling module 204 can reduce the number of user profiles that are needed for purposes of determining the profile model. For example, the fan sampling module 204 can sample a subset of users with a maximum size x. The size of x is tunable depending on the amount of computing resources that are available for computing the profile model. In some embodiments, the fans of a page can be sampled depending on whether their interactions with the page are within some threshold period of time. For example, the sampling may be done using fans of the page that are active on the social networking system on a daily basis, monthly basis, or some other arbitrary period of time. In some embodiments, the sampling may be done using fans of the page that interact with the page on a daily basis, monthly basis, or some other arbitrary period of time.

In some embodiments, the fan sampling module 204 can assign respective weights to the user profiles being used to determine the profile model, so that the profiles of users that are more engaged with the page are weighted more than the profiles of users that are less engaged. In one example, the relationship strength, or affinity, between a user and the page can be measured based on how recently the user fanned the page. If the user fanned the page recently, then the fan sampling module 204 can assign a higher weight to the user's profile. In contrast, if the user fanned the page over a year ago, then the fan sampling module 204 can assign a lower weight to the user's profile. In one example, the relationship strength between a user and the page can be measured based on the user's interactions with the page as well as the rate, or frequency, at which such interactions were performed. The user may interact with the page in a number of ways including, for example, accessing (e.g., visiting) the page, accessing (e.g., reading, clicking, etc.) a content item that was posted in the page, liking a content item that was posted in the page, adding a comment to a content item that was posted in the page, and sending a message to an administrator of the page. Some interactions can more representative of the user's relationship with the page than others and, therefore, each interaction may be weighted differently. For example, adding comments to content items posted in the page and messaging administrators of the page can each be weighted higher than accessing the page or accessing a content item that was posted in the page. If the user has not interacted with the page after fanning the page, then the fan sampling module 204 can assign an even lower weight. The actual weights used, and any adjustment to such weights, can vary depending on the implementation. However, any rubric may be used for weighting of user profiles for purposes of generating profile models.

The model generating module 206 can be configured to generate the profile model for the page using all, or a subset, of the profiles of users associated with the page. Depending on the implementation, these profiles may or may not be weighted, as described above. In some embodiments, the model generating module 206 can be configured to generate the profile model for the page by constructing respective probability distributions, or histograms, for some, or all, of the profile settings specified by fans of the page. Thus, in some embodiments, a profile model for the page may reference several probability distributions that each describe the distribution of the page's fans in terms of a particular characteristic (i.e., profile setting). For example, a page may have a first probability distribution for age, a second probability distribution for gender, and a third probability distribution for occupation. A probability distribution for a characteristic (e.g., profile setting) can include respective bins that each correspond to the values that were provided by fans of the page for that profile setting. For example, a probability distribution for occupation can include the bins "professor", "marketing analyst", "researcher", "software engineer", "student", and "null" (for users that have not specified a profile setting value for occupation). Each fan of the page can be assigned to one of the bins based on the occupation defined in their profile setting. Once the fans have been assigned to the bins, the model generating module 206 can determine whether the probability distribution has a threshold modal distribution. For example, in some embodiments, the occupation "software engineer" may be determined to be modal because that occupation was listed most frequently as an occupation by fans of the page. In some embodiments, when determining whether a profile setting value is modal, the model generating module 206 can determine whether a threshold proportion of the page's fans (e.g., some percentage of the fans) have listed that value for their profile setting. This threshold may vary depending on the page. For example, a first page may require a profile setting value to be specified by 40 percent of the page's fans before qualifying as a modality while a second page may require a profile setting value to be specified by 80 percent of the page's fans before qualifying as a modality. In some instances, the probability distribution for a profile setting may be multi-modal. For example, based on the probability distribution, the model generating module 206 may determine that both "software engineer" and "student" were listed as occupations by threshold proportion of the page's fans. In this example, both the occupations "software engineer" and "student" may both be determined to be modal.

In some embodiments, the model generating module 206 can evaluate any modalities determined for the page for accuracy before using the modalities for recommending the page or for filtering recommendations for the page. For example, the occupation "software engineer" may be determined to be modal for a page. In this example, the page may be recommended to users of the social networking system that have "software engineer" listed as their occupation. In such embodiments, the model generating module 206 can determine whether a threshold number, or percentage, of conversions result from users that were recommended the page based on their respective occupations being listed as "software engineer". A conversion may include, for example, fanning the page, accessing (e.g., visiting) the page, accessing (e.g., reading, clicking, etc.) a content item that was posted in the page, liking a content item that was posted in the page, adding a comment to a content item that was posted in the page, and sending a message to an administrator of the page. Modalities that demonstrate a threshold amount of correlation with the page can be stored as a profile model for the page. This profile model can then be used for recommending the page or for filtering recommendations for the page based on whether a user shares some, or all, of the modal characteristics (i.e., profile setting values) for the page.

In some embodiments, the model generating module 206 can be configured to cluster values provided by users for various profile settings based on their similarity. For example, the occupations listed by a page's fans may include "mechanical engineer", "electrical engineer", "software engineer", "chemical engineer", "social worker", and "financial analyst". In some instances, computing a probability distribution that includes separate bins that each correspond one of these occupations may not be optimal. In such instances, the model generating module 206 can be configured to cluster occupations based on their similarity. In the example above, the occupations "mechanical engineer", "electrical engineer", "software engineer", and "chemical engineer" can be clustered into one bin associated with the occupation "engineer". Such clustering of profile setting values may be performed using any generally known approach for clustering strings. Depending on the implementation, the similarity between two profile setting values may be measured based on semantic similarity and/or string similarity (e.g., edit distance). In some embodiments, some profile settings can be bucketed to facilitate the distribution analysis. For example, users can be assigned to bins that correspond to age ranges (e.g., ages 12-17, 18-24, 25-34, 35-44, 45-54, 55-64, 64+) based on their age profile setting.

In some embodiments, the model generating module 206 can be configured to generate the profile model for the page by training a machine learning (ML) model that corresponds to the page. The trained ML model for the page can predict, using profile settings for a user, a likelihood that measures whether the user shares one or more profile setting values that are modal for the page. In some embodiments, the ML model can be trained using a set of positive examples that include profile settings of some, or all, of the page's fans, which may or may not be weighted, as described above. The ML model can also be trained using a set of negative examples that include profile settings of randomly selected users of the social networking system. As described above, the model generating module 206 can evaluate any predictions made using the trained ML model for accuracy and for re-training the ML model based on the accuracy or inaccuracy of the prediction.

Figure 3:
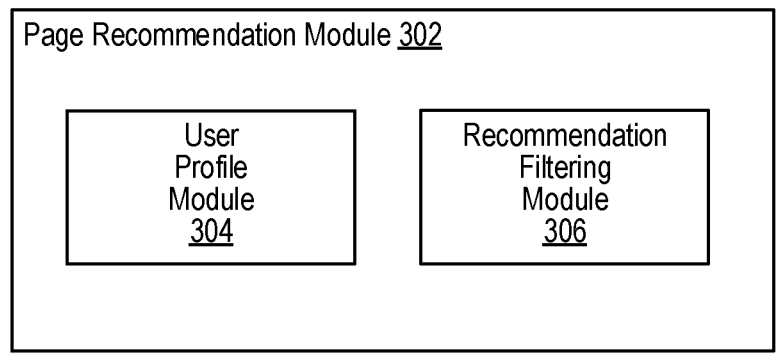
FIG. 3 illustrates an example of a page recommendation module configured to provide page recommendations, according to an embodiment of the present disclosure.

FIG. 3 illustrates an example of a page recommendation module 302 configured to provide page recommendations, according to an embodiment of the present disclosure. In some embodiments, the page recommendation module 106 of FIG. 1 can be implemented as the page recommendation module 302. As shown in FIG. 3, the page recommendation module 302 can include a user profile module 304 and a recommendation filtering module 306.

The user profile module 304 can be configured to obtain a profile associated with a candidate user to whom a page recommendation may be made. As mentioned, through this profile, the user can specify values for profile settings that correspond to various characteristics, such as age, gender, gender preference, relationship status, occupation and/or workplace, education level, one or more institutions of which the user is an alumni, religious affiliation, and political affiliation. These profile settings are provided merely as examples and, naturally, users may be able to set additional profile settings to describe other characteristics.

The recommendation filtering module 306 can be configured to determine whether a page should, or should not, be recommended to the candidate user, for example, based on the profile setting values specified in the user's profile and a profile model for the page. In some embodiments, the recommendation filtering module 306 determines whether any of the user's profile setting values correspond to one or more modalities referenced in the profile model that was determined for the page. In such embodiments, the recommendation filtering module 306 can recommend the page to the user if any of the user's profile setting values correspond to the one or more modalities for the page. In some embodiments, the recommendation filtering module 306 can filter, or prevent, the page from recommended to the user if none of the user's profile setting values correspond to the one or more modalities for the page. In some embodiments, the recommendation filtering module 306 can be configured to determine whether the page should, or should not, be recommended to the user based on a trained ML model, as described above.

Figure 4:
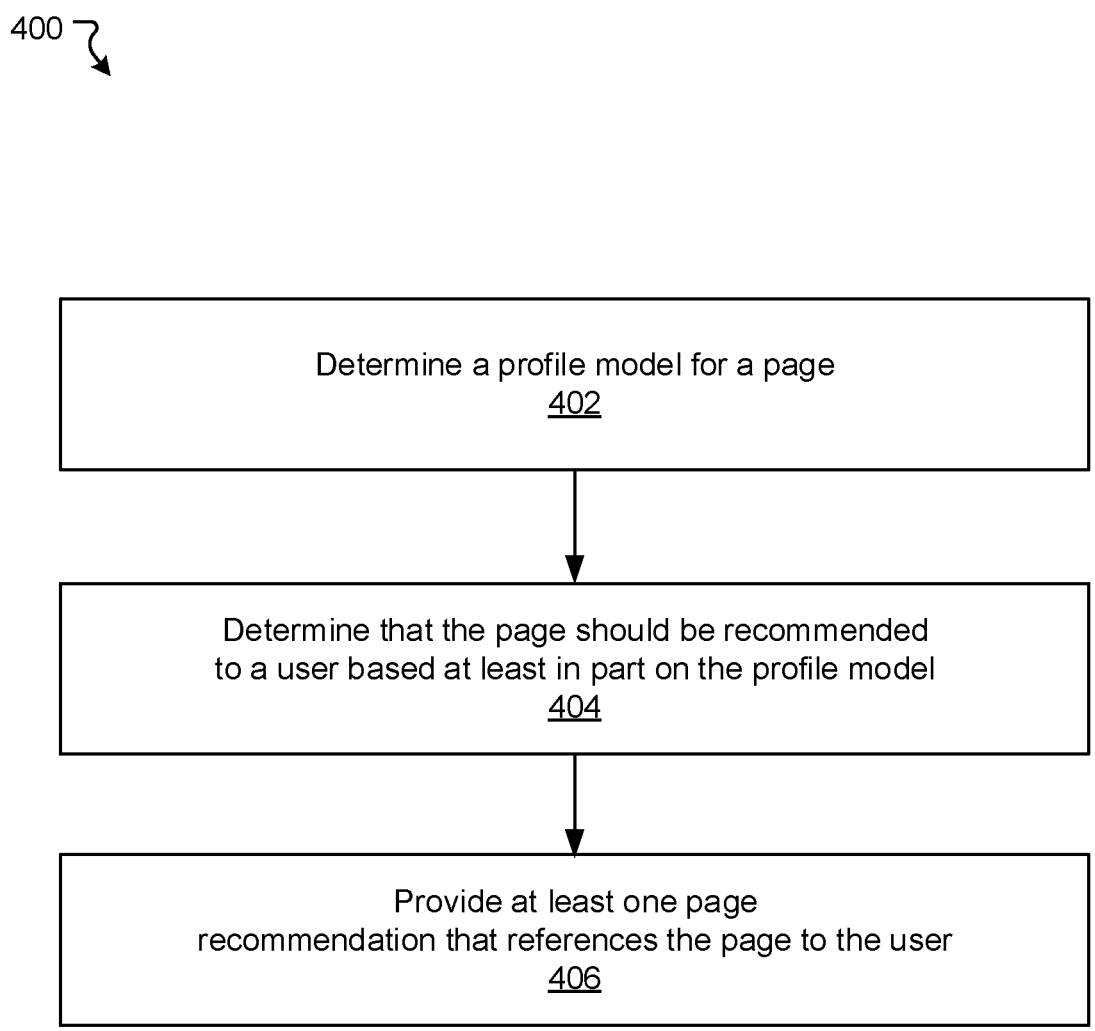
FIG. 4 illustrates an example process for determining page recommendations, according to an embodiment of the present disclosure.

FIG. 4 illustrates an example process 400 for determining page recommendations, according to an embodiment of the present disclosure. It should be appreciated that there can be additional, fewer, or alternative steps performed in similar or alternative orders, or in parallel, within the scope of the various embodiments discussed herein unless otherwise stated. At block 402, a profile model for a page that is accessible through the social networking system is determined. The profile model can describe one or more modal characteristics of users of the social networking system that have fanned the page. At block 404, a determination can be made that the page should be recommended to a first user of the social networking system based at least in part on the profile model. At block 406, at least one page recommendation that references the page can be provided to the first user.

Figure 5:
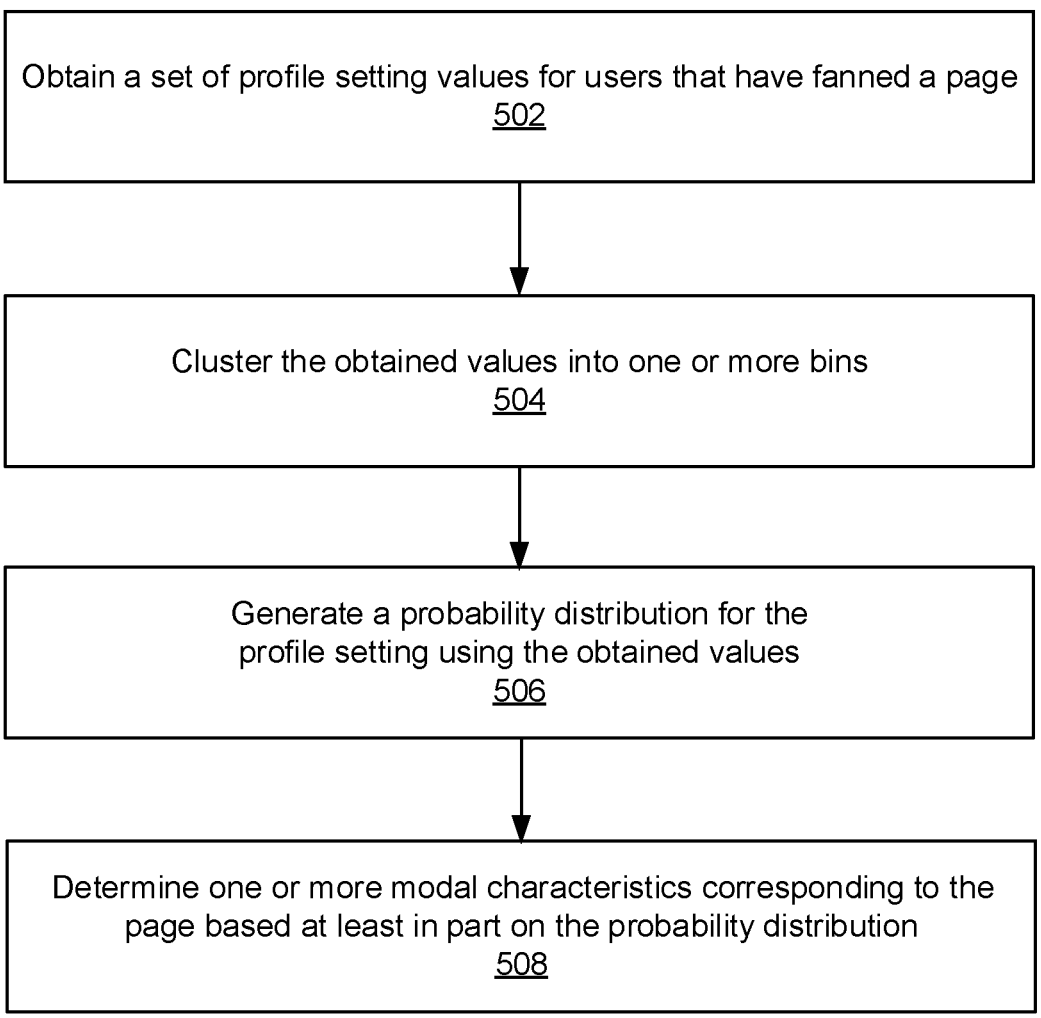
FIG. 5 illustrates example process for determining a profile model for a page, according to an embodiment of the present disclosure.

FIG. 5 illustrates example process 500 for determining a profile model for a page, according to an embodiment of the present disclosure. It should be appreciated that there can be additional, fewer, or alternative steps performed in similar or alternative orders, or in parallel, within the scope of the various embodiments discussed herein unless otherwise stated. At block 502, a set of profile setting values are obtained for users that have fanned a page. At block 504, the values are clustered into one or more bins based at least in part on a semantic similarity or a string similarity. At block 506, a probability distribution for the profile setting is constructed using the values that were provided by the users that have fanned the page. At block 508, one or more modal characteristics corresponding to the page are determined based at least in part on the probability distribution.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
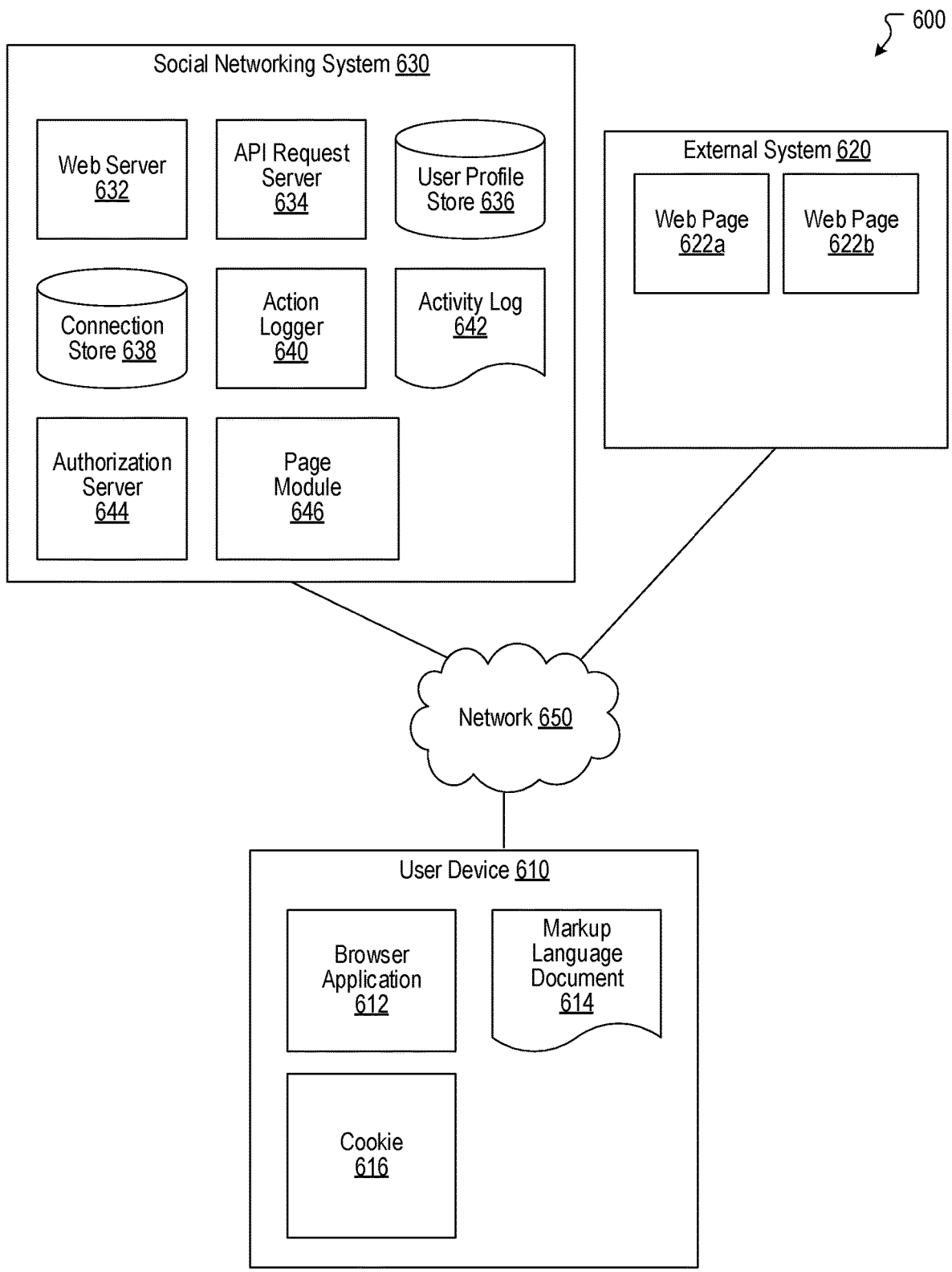
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a page module 646. The page module 646 can, for example, be implemented as the page module 102 of FIG. 1. As discussed previously, it should be appreciated that there can be many variations or other possibilities.

Hardware Implementation

Figure 7:
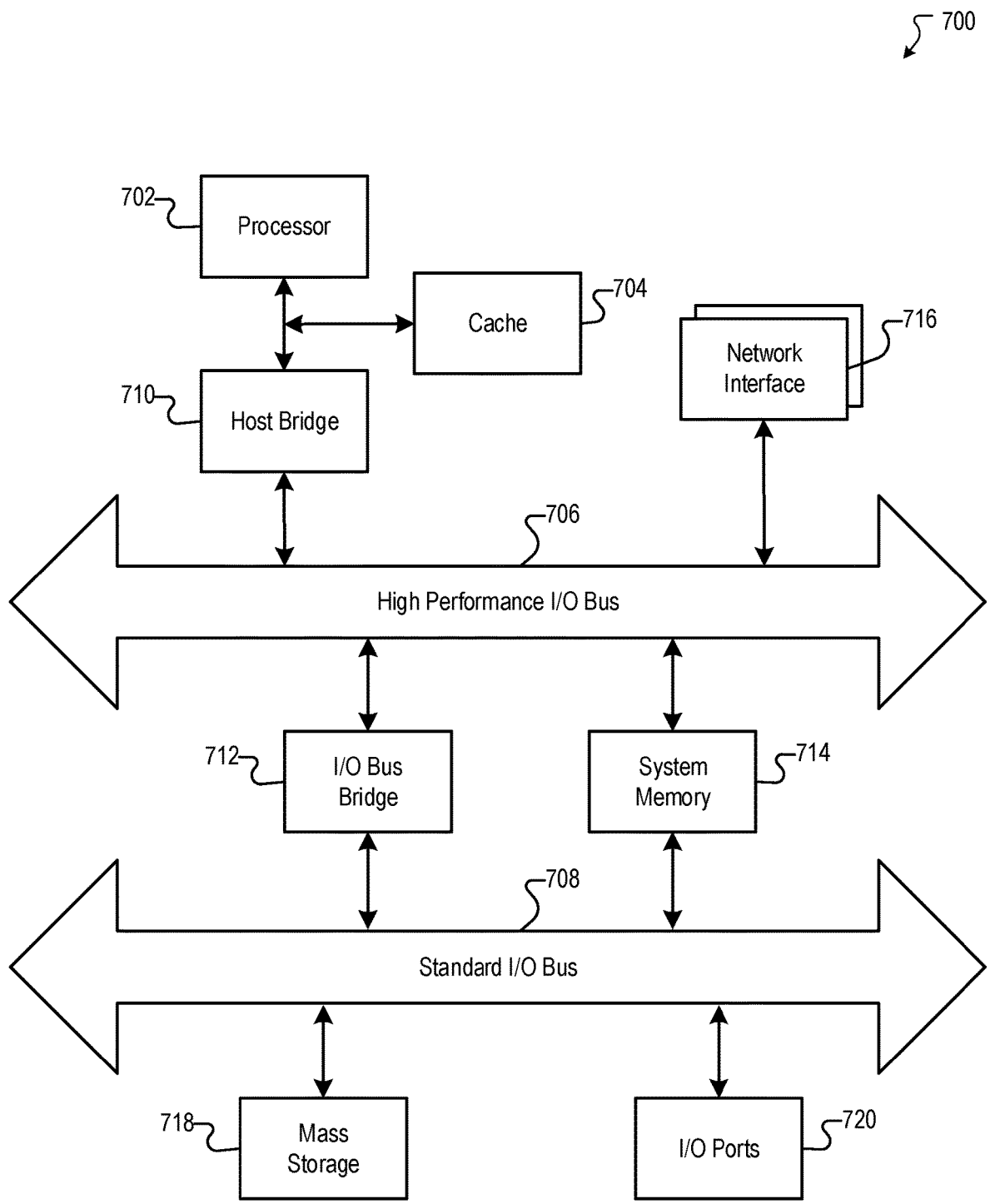
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a profile model for a page that is accessible through the computing system, the profile model describing one or more modal characteristics of users of the computing system that have fanned the page, the determining further comprising:
   determining, by the computing system, at least one probability distribution for a profile setting, the probability distribution being constructed using values associated with the profile setting by the users that have fanned the page;
   determining, by the computing system, the one or more modal characteristics based at least in part on the probability distribution;
   providing, by the computing system, page recommendations that reference the page to a plurality of users of the computing system that specified at least one profile setting value that corresponds to a first modal characteristic in the one or more modal characteristics;
   determining, by the computing system, that a threshold amount of the page recommendations resulted in at least one conversion by the users;
   associating, by the computing system, the first modal characteristic with the page;
   determining, by the computing system, that no profile setting values specified by a second user satisfy the first modal characteristic associated with the page; and
   filtering, by the computing system, the page from being recommended to the second user.

2. The computer-implemented method of claim 1, the method further comprising:
   clustering, by the computing system, the values into one or more bins based at least in part on a semantic similarity or a string similarity.

3. The computer-implemented method of claim 1, wherein the profile setting corresponds to at least one of the following characteristics: age, gender, gender preference, relationship status, occupation, workplace, education level, an institution of which the user is an alumni, religious affiliation, political affiliation, marital status, parental status, or causes supported by the user.

4. The computer-implemented method of claim 1, wherein one or more of the values provided for the profile setting by the users that have fanned the page are weighted, wherein the weighting of a value specified by a user is based at least in part on a respective affinity between the user and the page.

5. The computer-implemented method of claim 1, wherein determining the profile model for the page further comprises:
   generating, by the computing system, a trained machine learning model for the page, the machine learning model being trained to predict whether profile setting values specified by a user correspond to the one or more modal characteristics of users that have fanned the page.

6. The computer-implemented method of claim 1, the method further comprising:
   determining, by the computing system, that the page should be recommended to a first user of the computing system, the determining further comprising:
   determining, by the computing system, that the first user of the computing system has specified at least one profile setting value that corresponds to the first modal characteristic associated with the page; and
   providing, by the computing system, at least one page recommendation to the first user that references the page.

7. A system comprising:
   at least one processor; and
   a memory storing instructions that, when executed by the at least one processor, cause the system to perform:
   determining a profile model for a page that is accessible through the system, the profile model describing one or more modal characteristics of users of the system that have fanned the page, the determining further comprising:
   determining at least one probability distribution for a profile setting, the probability distribution being constructed using values associated with the profile setting by the users that have fanned the page;
   determining the one or more modal characteristics based at least in part on the probability distribution;

providing page recommendations that reference the page to a plurality of users of the system that specified at least one profile setting value that corresponds to a first modal characteristic in the one or more modal characteristics;

determining that a threshold amount of the page recommendations resulted in at least one conversion by the users;

associating the first modal characteristic with the page;

determining that no profile setting values specified by a second user satisfy the first modal characteristic associated with the page; and filtering the page from being recommended to the second user.

8. The system of claim 7, wherein the system further performs:

clustering the values into one or more bins based at least in part on a semantic similarity or a string similarity.

9. The system of claim 7, wherein the profile setting corresponds to one of the following characteristics: age, gender, gender preference, relationship status, occupation, workplace, education level, an institution of which the user is an alumni, religious affiliation, political affiliation, marital status, parental status, or causes supported by the user.

10. The system of claim 7, wherein the system further performs:

determining that the page should be recommended to a first user of the system, the determining further comprising:

determining that the first user of the system has specified at least one profile setting value that corresponds to the first modal characteristic associated with the page; and providing at least one page recommendation to the first user that references the page.

11. The system of claim 7, wherein the profile setting corresponds to at least one of the following characteristics: age, gender, gender preference, relationship status, occupation, workplace, education level, an institution of which the user is an alumni, religious affiliation, political affiliation, marital status, parental status, or causes supported by the user.

12. The system of claim 7, wherein one or more of the values provided for the profile setting by the users that have fanned the page are weighted, wherein the weighting of a value specified by a user is based at least in part on a respective affinity between the user and the page.

13. The system of claim 7, wherein the system further performs:

generating a trained machine learning model for the page, the machine learning model being trained to predict whether profile setting values specified by a user correspond to the one or more modal characteristics of users that have fanned the page.

14. A non-transitory computer-readable storage medium including instructions that, when executed by at least one processor of a computing system, cause the computing system to perform a method comprising:

determining a profile model for a page that is accessible through the computing system, the profile model describing one or more modal characteristics of users of the computing system that have fanned the page, the determining further comprising:

determining at least one probability distribution for a profile setting, the probability distribution being constructed using values associated with the profile setting by the users that have fanned the page;

determining the one or more modal characteristics based at least in part on the probability distribution;

providing page recommendations that reference the page to a plurality of users of the computing system that specified at least one profile setting value that corresponds to a first modal characteristic in the one or more modal characteristics;

determining that a threshold amount of the page recommendations resulted in at least one conversion by the users;

associating the first modal characteristic with the page;

determining that no profile setting values specified by a second user satisfy the first modal characteristic associated with the page; and filtering the page from being recommended to the second user.

15. The non-transitory computer-readable storage medium of claim 14, wherein the computing system further performs:

clustering the values into one or more bins based at least in part on a semantic similarity or a string similarity.

16. The non-transitory computer-readable storage medium of claim 14, wherein the profile setting corresponds to one of the following characteristics: age, gender, gender preference, relationship status, occupation, workplace, education level, an institution of which the user is an alumni, religious affiliation, political affiliation, marital status, parental status, or causes supported by the user.

17. The non-transitory computer-readable storage medium of claim 14, wherein the computing system further performs:

determining that the page should be recommended to a first user of the computing system, the determining further comprising:

determining that the first user of the computing system has specified at least one profile setting value that corresponds to the first modal characteristic associated with the page; and providing at least one page recommendation to the first user that references the page.

18. The non-transitory computer-readable storage medium of claim 14, wherein the profile setting corresponds to at least one of the following characteristics: age, gender, gender preference, relationship status, occupation, workplace, education level, an institution of which the user is an alumni, religious affiliation, political affiliation, marital status, parental status, or causes supported by the user.

19. The non-transitory computer-readable storage medium of claim 14, wherein one or more of the values provided for the profile setting by the users that have fanned the page are weighted, wherein the weighting of a value specified by a user is based at least in part on a respective affinity between the user and the page.

20. The non-transitory computer-readable storage medium of claim 14, wherein the computing system further performs:

generating a trained machine learning model for the page, the machine learning model being trained to predict whether profile setting values specified by a user correspond to the one or more modal characteristics of users that have fanned the page.

* * * * *